(12) United States Patent
Tabellion et al.

(10) Patent No.: US 7,210,741 B2
(45) Date of Patent: May 1, 2007

(54) SEAT HAVING PIVOTABLE SEAT CUSHION

(75) Inventors: Joerg Tabellion, Bergisch Gladbach (DE); James Abraham, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 11/402,663

(22) Filed: Apr. 12, 2006

(65) Prior Publication Data

US 2006/0202532 A1    Sep. 14, 2006

Related U.S. Application Data

(63) Continuation of application No. PCT/EP2004/010228, filed on Sep. 13, 2004.

(30) Foreign Application Priority Data

Oct. 13, 2003    (DE) .............................. 103 48 085

(51) Int. Cl.
  *B60N 2/02*    (2006.01)
(52) U.S. Cl. .................. 297/325; 297/316; 297/334
(58) Field of Classification Search ................ 297/322, 297/324, 334, 335, 15, 325, 316, 320, 340; 296/65.09
See application file for complete search history.

(56) References Cited

U.S. PATENT DOCUMENTS 5,195,795 A * 3/1993 Cannera et al. .......... 296/65.09
5,685,608 A * 11/1997 Yamazaki .................... 297/335
2005/0269830 A1* 12/2005 Epaud ..................... 296/65.09
2006/0103174 A1* 5/2006 Queveau et al. .............. 297/15

FOREIGN PATENT DOCUMENTS

| DE | 199 43 891 C1 | 11/2000 |
| EP | 1304256 A2 | 4/2003 |
| WO | WO 01/38131 A1 | 5/2001 |
| WO | WO 03/002372 A1 | 1/2003 |

OTHER PUBLICATIONS

English Translation of the International Preliminary Examination Report of corresponding PCT-Application PCT/EP2004/010228 (7 pp.).

* cited by examiner

*Primary Examiner*—Milton Nelson, Jr.
(74) *Attorney, Agent, or Firm*—Foley & Lardner LLP

(57) ABSTRACT

A vehicle seat includes a lower seat part that includes a seat cushion and a backrest, the backrest connected to the seat cushion such that the backrest can rotate about a first axis. The seat cushion is configured for movement between a use position and a loading position by rotating the seat cushion through approximately 180° about a second axis parallel to the first axis. The seat further includes a first lever and a second lever for defining the movement between the use position and the loading position. The first lever and second lever are coupled to the lower seat part at a first location and a second location. The first location is closer to the front in relation to a direction of travel as compared to the second location and the first lever is positioned essentially identically both in the use position and in the loading position.

10 Claims, 4 Drawing Sheets

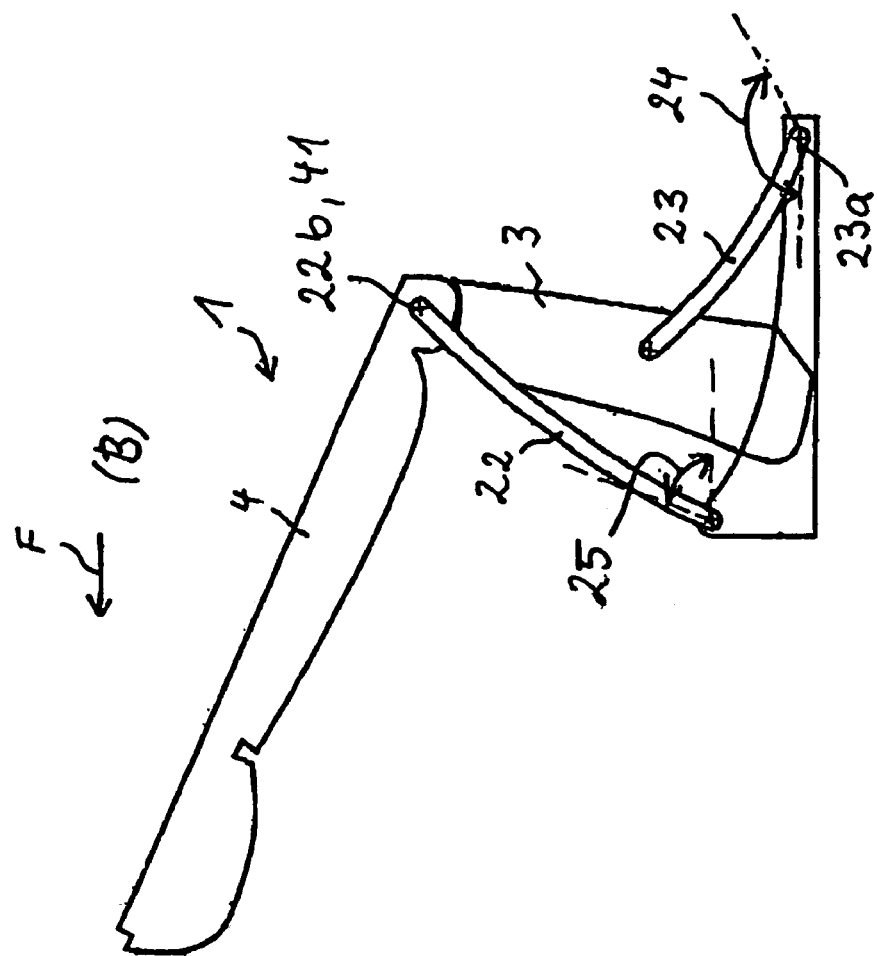
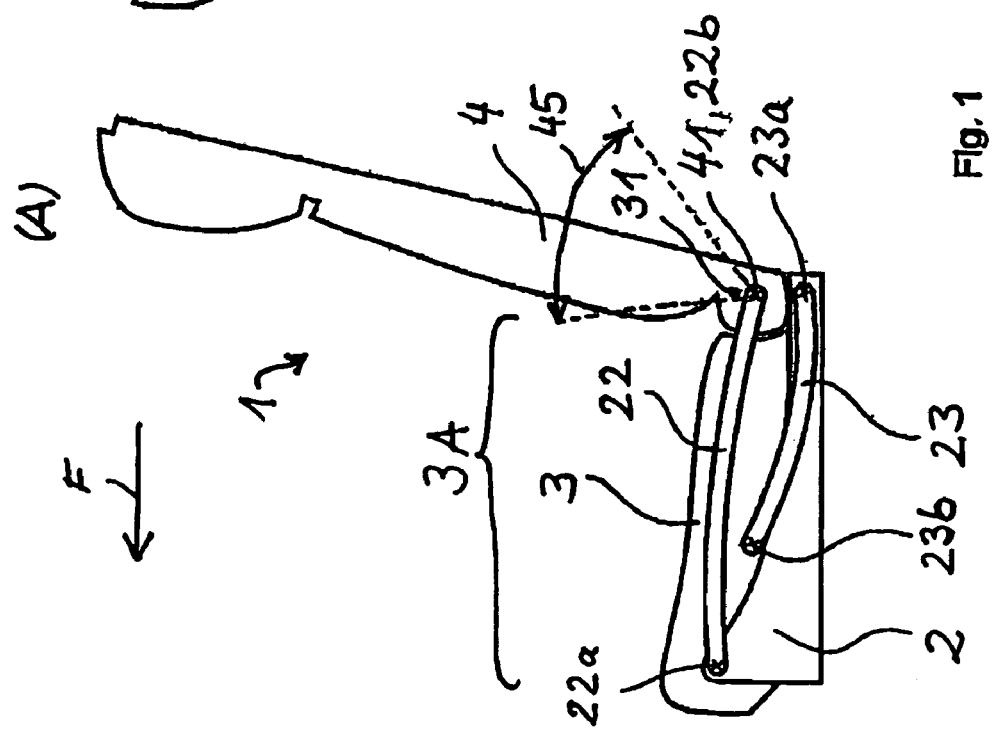

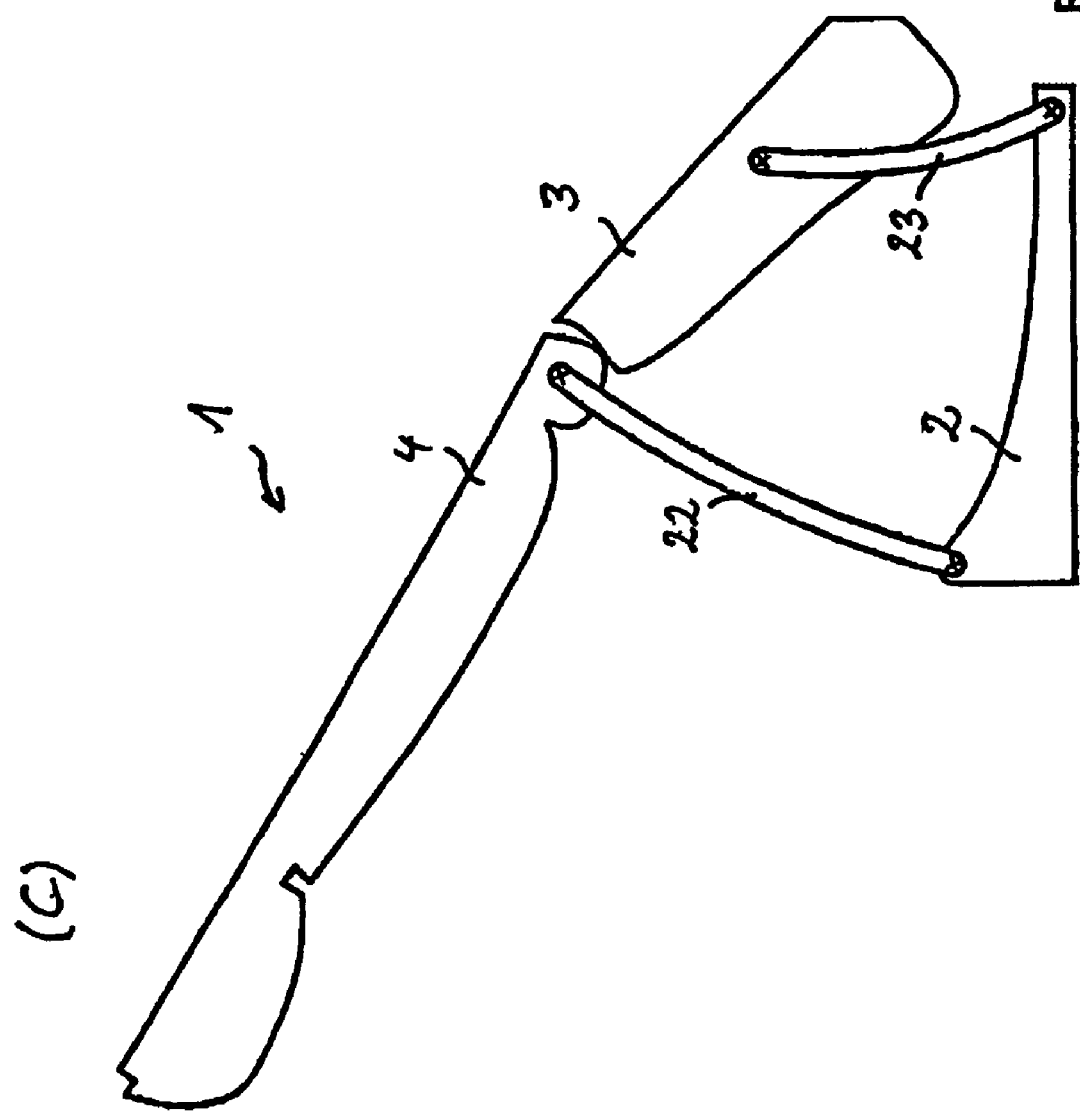

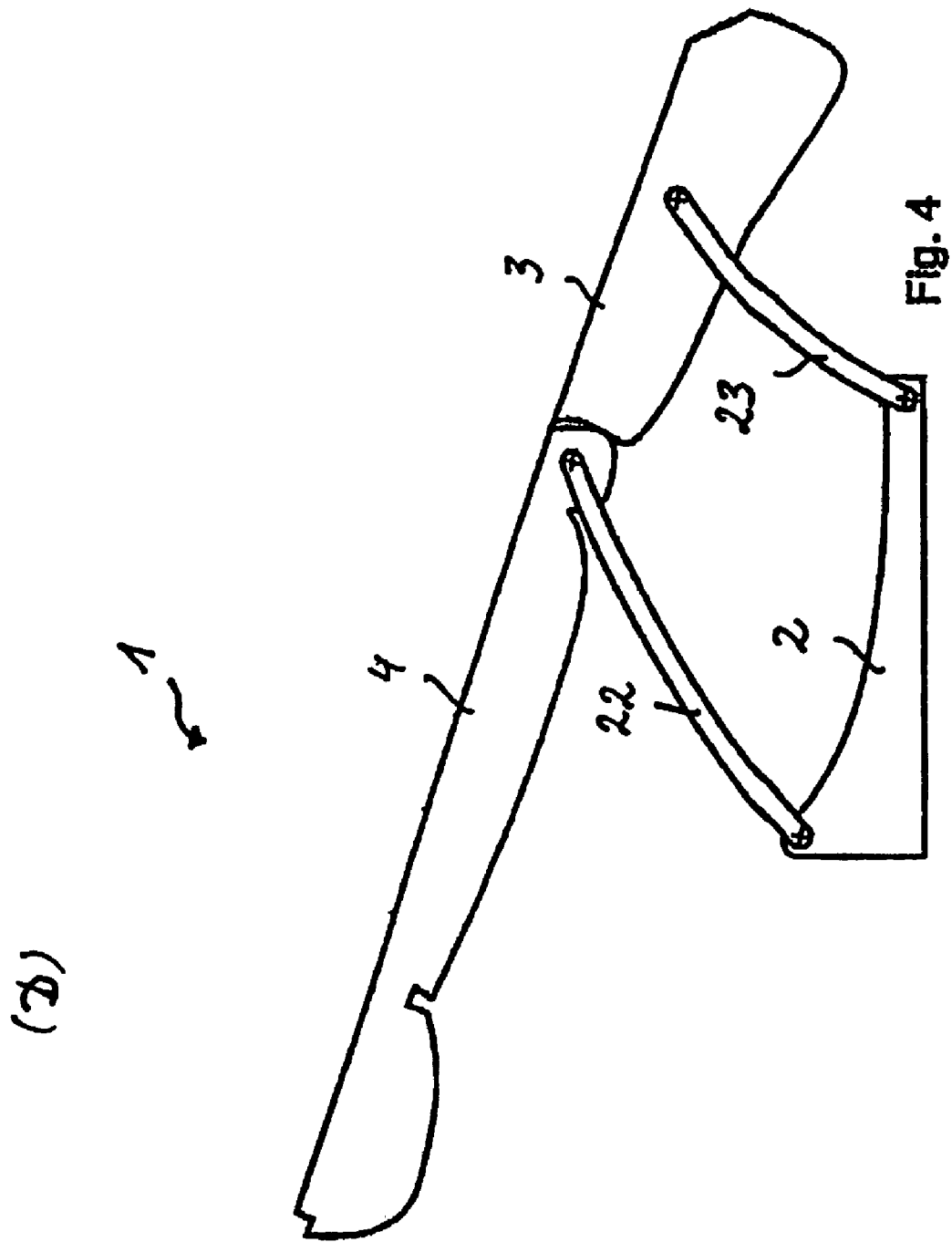

SEAT HAVING PIVOTABLE SEAT CUSHION

CROSS-REFERENCE TO RELATED PATENT APPLICATIONS

This application is a Continuation of International Application No. PCT/EP2004/010228, filed Sep. 13, 2004, which claims priority to German Application No. DE 103 48 085.4 filed Oct. 13, 2003. The entire disclosure of International Application No. PCT/EP2004/010228 and German Application No. DE 103 48 085.4 are incorporated herein by reference.

BACKGROUND

The invention relates to a seat, in particular a vehicle seat, with a lower seat part, with a seat cushion part and with a backrest part, the backrest part being pivotable and the entire seat being settable into a loading position in such a manner that a relatively large loading compartment volume of a vehicle is made possible, with the seat cushion part being pivoted or rotated.

For example, the publication WO 01/38131 discloses a vehicle seat, in which a cushion, which is held by means of a frame, for a seat surface of the vehicle seat is arranged displaceably (linearly) in such a manner that the cushion and the frame can be moved under a loading compartment floor covering by means of an essentially translatory movement, so that a relatively large available loading compartment volume is possible. A disadvantage in this case is that the rear side of the upholstery of the seat surface cannot be used as the luggage compartment floor, so the known vehicle seat becomes heavier, more expensive and more complicated as a result.

Furthermore, the publication EP 1 304 256 discloses an inclinable rear seat for a vehicle, in which a comparatively complicated mechanism ensures that both the backrest or a backrest part of the vehicle seat and a seat part of the vehicle seat can be pivoted in relation to a securing of the seat in the vehicle in such a manner that the rear sides both of the backrest part and of the seat part end essentially flush with a loading compartment floor, with the result that, when the vehicle seat is in a folded-over position, an increase in the loading compartment volume is possible. In this case, it is disadvantageous that a complicated adjustment or movement mechanism is required for the adjustment of the vehicle seat from a use position into a loading position or vice versa. A complicated mechanism of this type has a plurality of disadvantageous effects. For example, a mechanism of this type is expensive, not comparatively stable, heavier than a simple mechanism, and is more difficult to fit in a vehicle, which in turn increases the costs for installing the vehicle seat in the vehicle.

Another disadvantage of the known vehicle seat is that, in the loading position of the vehicle seat, parts of the vehicle seat are not positioned sufficiently far to the rear in the vehicle. In the case of the known vehicle seats, obstructions during the folding over of the vehicle seat or during the loading of the vehicle or during the loading of its loading volume may therefore occur.

Accordingly, there is a need to provide an improved vehicle seat having a pivotable seat cushion.

SUMMARY

An exemplary embodiment of the invention relates to a vehicle seat that includes a lower seat part comprising a seat cushion and a backrest, the backrest being connected to the seat cushion such that the backrest can rotate about a first axis. The seat cushion is configured for movement between a use position and a loading position by rotating the seat cushion through approximately 180° about a second axis that is parallel to the first axis. The seat further comprises a first lever and a second lever for defining the movement between the use position and the loading position, the first lever being coupled to the lower seat part at a first location and the second lever being coupled to the lower seat part at a second location. The first location is closer to a front of the vehicle seat in relation to a direction of travel as compared to the second location and wherein the first lever is positioned essentially identically both in the use position and in the loading position.

BRIEF DESCRIPTION OF THE DRAWINGS

The invention is explained in more detail below with reference to exemplary embodiments which are illustrated in the drawing.

FIG. 1 shows a seat according to the invention in its use position.

FIGS. 2, 3 and 4 show the seat according to the invention in intermediate positions.

DETAILED DESCRIPTION

Figure 5:
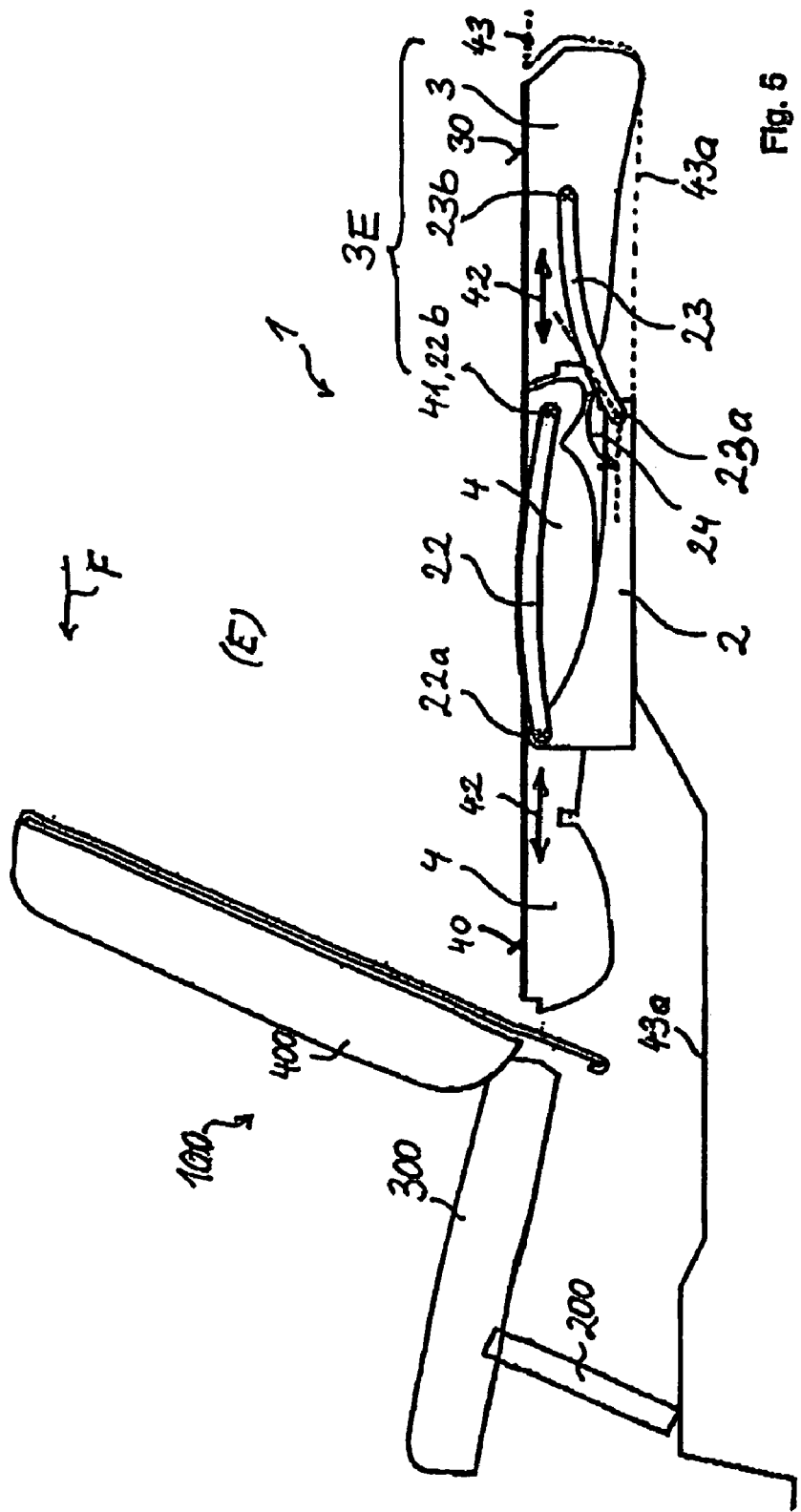
FIG. 5 shows the seat according to the invention in its loading position together with a further seat of a seat row arranged in front of the seat according to the invention.

According to an exemplary embodiment, a seat, in particular a vehicle seat, is provided in which the disadvantages of the prior art are avoided and which furthermore is of simple and stable construction, can be produced cost-effectively, can be fitted easily and cost-effectively and furthermore has a long service life and great reliability over the entire service life of the seat.

Such advantages are achieved according to an exemplary embodiment by a seat, in particular a vehicle seat, in which the seat has a lower seat part, a seat cushion part and a backrest part, the backrest part being connected to the seat cushion part in a manner such that it can rotate about a first axis, the seat being settable into a use position and into a loading position, and a movement of the seat cushion part between the use position and the loading position of the seat being provided, which movement comprises a rotation of the seat cushion part through approximately 180° about a second axis parallel to the first axis, the movement furthermore being defined by a first lever which is fastened to the lower seat part in a position further to the front in relation to a direction of travel and by a second lever which is fastened to the lower seat part in a position further to the rear in relation to the direction of travel, the first lever being positioned essentially identically both in the use position and in the loading position. It is thereby possible, according to the exemplary embodiment, to provide a particularly simple and robust vehicle seat or mechanism for a vehicle seat which can be produced cost-effectively and can be fitted cost-effectively, with the result that a vehicle equipped with a seat of this type likewise has the advantageous properties described above.

It is preferably furthermore provided that, in the use position of the seat, on the one hand, and in the loading position of the seat, on the other hand, the seat cushion part takes up two essentially nonoverlapping spatial regions. According to an exemplary embodiment, a vehicle seat is provided which has a lower seat part, a seat cushion part and a backrest part, the backrest part being connected to the seat cushion part in a manner such that it can rotate about a first axis, the seat being settable into a use position and into a loading position, and a movement of the seat cushion part between the use position and the loading position of the seat being provided, which movement comprises a rotation of the seat cushion part through approximately 180° about a second axis parallel to the first axis, furthermore, in the use position of the seat, on the one hand, and in the loading position of the seat, on the other hand, the seat cushion part taking up two essentially nonoverlapping spatial regions. It is thereby possible in a particular manner to arrange the seat or parts of the seat in its loading position in such a manner that there is no restriction during the folding or during the setting of the loading position together with further seats arranged in front of the seat. In this respect, such a vehicle seat contributes to it being possible to carry out the development and the design of seats to be fitted in different rows or at different positions in the vehicle largely independently of one another, so that the complexity of the vehicle seat development can be reduced and therefore its costs can be reduced.

It is advantageously furthermore provided that the first axis is provided essentially at the same location in the use position of the seat and in the loading position of the seat, the first axis preferably being provided essentially perpendicularly to a direction of travel, the first axis being provided essentially perpendicularly to the direction of travel. By this means, it is possible to provide a particularly stable connection between the vehicle and the various parts of the vehicle seat. In particular, as a result, it is possible for the first lever, which is fastened to the lower seat part in a position further to the front, to only execute a pivoting movement during the folding over of the seat but otherwise to take up essentially an identical position both in the use position and in the loading position of the seat. This increases the stability and the simplicity of the connection between the seat cushion part and the lower seat part or in general between the seat and the vehicle.

Furthermore, it is preferred that the levers are part of a movement mechanism connecting the lower seat part and the seat cushion part. One advantageous feature of the movement mechanism is that such a mechanism makes it possible to relatively simply and easily fold the seat, since the movement of the seat during the folding-over operation is relatively strictly specified and, as a result, erroneous positions during the folding over of the seat and erroneous operations are largely avoided.

According to an exemplary embodiment, in the loading position of the seat, the second lever is pivoted about a specified angle in relation to the use position of the seat. By this means, the connection of the seat cushion part to the lower seat part can be designed simply and robustly to a particular extent. Furthermore, it is possible, as a result, that a particularly stable folding over, which is also robust with regard to an erroneous operation, for example, by children or the like, is increased.

Furthermore, it is preferred that, in the loading position of the seat, the backrest part is arranged essentially in a plane with the seat cushion part. Furthermore, it is preferred that, in the loading position of the seat, the backrest part adjoins the seat cushion part. It is thereby possible for the vehicle seat to be arranged very flat or very low in its loading position, with the result that there is scarcely any restriction of the loading compartment volume that is theoretically possible from the dimensions of the vehicle.

Furthermore, it is preferred that, in the loading position of the seat, the rear side of the backrest part and the rear side of the seat cushion part coincide with a loading compartment plane. In this case, even the region which is taken up by the folded-over vehicle seat (in its use position) can be used as a loading compartment region which is more at ground level or adjoins the loading compartment plane. It is furthermore particularly advantageous in this connection that no additional loading compartment coverings or the like are required in order, for example, to bring about a protection of the upholstery or of the use sides of the seat because the use sides of the seat point downward and therefore the impairment thereof by the use of the seat (of the rear side of the seat) as part of the loading compartment surface is prevented or is largely prevented.

Furthermore, it is preferred that the seat is part of a third row of seats of a vehicle. In the case of an embodiment of this type, the features described above have a particularly advantageous effect.

FIG. 1 illustrates a seat 1 according to an exemplary embodiment, in particular a vehicle seat, in its use position A. The seat 1 has a lower seat part 2, a seat cushion part 3 and a backrest part 4. The lower seat part 2 is connected to a vehicle (not illustrated). This connection of the seat 1 to the vehicle via the lower seat part 2 is generally provided in such a manner that the seat 1 is moveable as a whole relative to the vehicle (not illustrated), in particular in a translatory manner. Furthermore, the seat 1, i.e., in particular its lower seat part 2, can be provided in a manner such that it is also height-adjustable and/or adjustable in another respect in relation to the vehicle.

In the case of the seat 1, the backrest part 4 is preferably connected to the seat cushion 3 in a manner such that it can rotate about a first axis 41. According to an exemplary embodiment, in the use position A of the seat 1, the backrest part 4 can be set merely in a single angular position about the first axis 41 and also can be set or pivoted within an angular range 45 of greater or lesser size in order to be able to satisfy the different use requirements of different users of the seat 1 or else of a single user in different use situations, for example, different loading situations of the vehicle. In this case, the first axis 41 runs essentially perpendicularly to the plane of the drawing and therefore also perpendicularly to a conventionally provided direction of travel F, which is indicated in FIG. 1 by means of an arrow. The direction of travel F here is illustrated in a conventional manner relative to the seat 1, namely such that a user (not illustrated) of the seat 1 who is sitting on the seat 1 in a conventional manner normally looks in the direction of travel F. Of course, it is also provided according to an exemplary embodiment that the seat 1 is arranged, for example, counter to the main direction of continued movement of the vehicle, so that a user of the seat 1 usually looks counter to the main direction of continued movement of the vehicle. In this case, of course, the direction of travel F is to be correspondingly reinterpreted.

According to an exemplary embodiment, a movement mechanism is provided in order to connect the lower seat part 2 to the seat cushion part 3 or to the backrest part 4 in such a manner that the seat 1 can be folded over or moved from its use position A into a loading position (to be described later). In a particularly simple and robust embodiment, the movement mechanism comprises in particular a first lever 22 and a second lever 23. The first lever 22 is connected moveably, in particular pivotably, to the lower seat part 2 at a first point 22a, and the first lever 22 is furthermore connected to the seat cushion part 3 or to the backrest part 4 at a further point 22b which, according to an exemplary embodiment, in particular approximately coincides with the first axis 41 or is situated in the spatial vicinity thereof. A second lever 23 is connected to the lower seat part 2 at a second point 23a and is connected at a further point 23b to the seat cushion part 3. The two levers 22, 23 are in each case connected rotatably to the lower seat part 2 and seat cushion part 3 at the first point 22a, 23a and the further point 22b, 23b or else at the connecting point of the seat cushion part 3 to the backrest part 4.

FIGS. 2, 3 and 4 illustrate further positions B, C, D of the seat 1, with in each case the lower seat part 2, the seat cushion part 3, the backrest part 4, the first lever 22 and the second lever 23 taking up different positions relative to one another. Starting from the use position A illustrated in FIG. 1, the respective positions B, C, D illustrated in FIGS. 2, 3 and 4 in each case increasingly merge into a loading position (to be described below).

FIG. 5 illustrates the loading position E of the seat 1, and furthermore indicates a further seat 100 of a seat row of the vehicle, which seat is situated in front of the seat 1 according to an exemplary embodiment or in front of a vehicle seat row fitted with a plurality of seats 1 according to an exemplary embodiment.

In the same manner as the seat 1, the further seat 100 comprises, by way of example, a further seat cushion part 300, a further backrest part 400 and, if appropriate, a further lower seat part 200. The further seat 100 is also arranged on or fastened to the vehicle (not illustrated), for example in front of the seat 1 according to the invention in the direction of travel F. The seat 1 again comprises the lower seat part 2, the seat cushion part 3, the backrest part 4 and the levers 22 and 23 connecting the lower seat part 2 to the remaining parts of the seat 1. In the loading position E of the seat 1, the backrest part 4 is preferably arranged essentially in a plane 42 of the seat cushion part 3. This means that the seat cushion part 3 and the backrest part 4 of the seat 1 are preferably arranged "stretched out" in the loading position E. In this case, the rear side (denoted by the reference number 40) of the backrest part 4 and the rear side (denoted by the reference number 30) of the seat cushion part 3 preferably form a common plane with a loading compartment plane (denoted by the reference number 43) of a loading compartment of the vehicle or of a loading compartment floor of the vehicle, which adjoins the vehicle floor (denoted by the reference number 43a).

The operation of the seat, of the movements of the backrest part 4, and of the seat cushion part 3 relative to the lower seat part 2 of the seat 1 (which operation is defined by the movement mechanism comprising in particular the first lever 22 and the second lever 23) emerges from the sequence of FIGS. 1, 2, 3, 4 and 5, in particular from the intermediate positions B, C, D of the seat 1. It can be seen in FIG. 2, for example, that, in the course of the folding-over movement between the use position A and the loading position E, the first lever 22 moves upward merely by a rotational amount denoted by the reference number 25 in order to permit the seat cushion part 3 to move below the further point 22b, which advantageously coincides in particular with the first axis 41, counter to the direction of travel F in order, via the intermediate stages of the further intermediate positions C, D, to adjoin the loading compartment plane 43 (compare FIG. 5). During this movement, the second lever 23 undertakes a rotational movement about the second point 23a (at which it is fastened rotatably to the lower seat part 2) at a specified angle 24 between its (rotational) positions in the use position A of the seat 1 and the loading position E of the seat 1. The specified angle 24 is shown both in FIG. 2 and in FIG. 5. It is furthermore apparent from FIGS. 1 and 5 that, firstly, a spatial region (denoted by means of the reference number 3A) which the seat cushion part 3 takes up in the use position A, and that, secondly, a spatial region (denoted by means of the reference number 3E), which denotes the spatial region taken up by the seat cushion part 3 in the loading position E of the seat 1, are completely different. It is therefore provided, according to an exemplary embodiment, that, starting from the use position A, the seat cushion part 3 is preferably moved completely out and takes up a second spatial region 3E completely separate from the first spatial region 3A. The seat cushion part 3 is (also) rotated through approximately 180° during this movement. Starting from the end positions of the seat cushion part 3, an axis of rotation of this rotational movement can be determined abstractly, with it being clear that the rotational movement does not take place literally "about this axis of rotation". This axis of rotation corresponds to the second axis 31 which, according to an exemplary embodiment, may be situated in the vicinity of the first axis 41 or else may coincide with the latter, but in any case runs essentially parallel to the latter. The fact that the spatial regions 3A, 3E are separate may also be expressed by the fact that the second axis 31 essentially does not run in the seat cushion part 3.

By means of the movement mechanism according to an exemplary embodiment, the seat cushion part 3 is arranged very far to the rear in its loading position E, i.e., displaced counter to the direction of travel F, so that there are no obstructions to this movement due to a further seat 100 possibly being present.

Furthermore, it is advantageous, according to an exemplary embodiment, that the first point 22a is provided on the lower seat part 2 in a position further to the front, i.e., further to the front in the direction of travel F, and that the second point 23a is provided on the lower seat part 2 in a position further to the rear in the direction of travel F. It is thereby possible for the movement mechanism for folding over the seat 1 to be able to be produced in a particularly simple and robust manner.

It is clear that the levers 22, 23 are preferably arranged on both sides of the lower seat part 2 or on the seat cushion part 3, so that the movement mechanism can be provided with relatively great stability. According to an exemplary embodiment, the specified angle 24 is preferably provided between 70° and 180°, preferably between 100° and 150°.

What is claimed is:

1. A vehicle seat comprising:
   a lower seat part comprising a seat cushion and a backrest, the backrest being connected to the seat cushion such that the backrest can rotate about a first axis,
   wherein the seat cushion is configured for movement between a use position and a loading position by rotating the seat cushion through approximately 180° about a second axis that is parallel to the first axis;
   wherein the seat further comprises a first lever and a second lever for defining the movement between the use position and the loading position, the first lever being coupled to the lower seat part at a first location and the second lever being coupled to the lower seat part at a second location;
   wherein the first location is closer to a front of the vehicle seat in relation to a direction of travel as compared to the second location and wherein the first lever is positioned essentially identically both in the use position and in the loading position.

2. The vehicle seat of claim 1, wherein the seat cushion takes up a first spatial region in the use position and a second spatial region in the loading position, the first and second spatial regions being essentially nonoverlapping.

3. The vehicle seat of claim 1, wherein the first axis is provided essentially at the same location in the use position and in the loading position.

4. The vehicle seat of claim 3, wherein first axis is essentially perpendicular to the direction of travel.

5. The vehicle seat of claim 1, wherein the first lever and second lever are part of a movement mechanism connecting backrest to the seat cushion.

6. The vehicle seat of claim 1, wherein in the loading position, the second lever is pivoted about a specified angle in relation to the use position.

7. The vehicle seat of claim 1, wherein in the loading position, the backrest is arranged essentially in a plane with the seat cushion.

8. The vehicle seat of claim 1, wherein in the loading position, the backrest adjoins the seat cushion.

9. The vehicle seat of claim 1, wherein in the loading position, a rear side of the backrest and a rear side of the seat cushion coincide with a loading compartment plane.

10. The vehicle seat of claim 1, wherein the vehicle seat is part of a third row of seats of a vehicle.

* * * * *

UNITED STATES PATENT AND TRADEMARK OFFICE
CERTIFICATE OF CORRECTION

PATENT NO. : 7,210,741 B2 Page 1 of 1
APPLICATION NO. : 11/402663
DATED : May 1, 2007
INVENTOR(S) : Joerg Tabellion and James Abraham It is certified that error appears in the above-identified patent and that said Letters Patent is hereby corrected as shown below:

IN THE CLAIMS

Column 7:

Line 8, insert --the-- between "wherein" and "first".

Column 7

Line 12, insert --the-- before "backrest".

Signed and Sealed this

Fourth Day of December, 2007

JON W. DUDAS
*Director of the United States Patent and Trademark Office*